Nov. 28, 1933.    D. D. KNOWLES    1,936,793
POINT SOURCE LIGHT FOR TELEVISION AND PICTURE RECEIVING
Filed Feb. 5, 1929
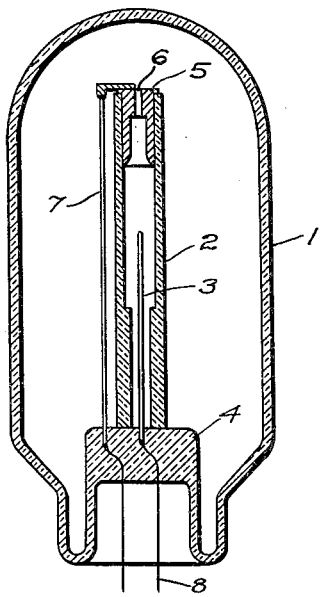
INVENTOR
Dewey D. Knowles.
BY
ATTORNEY Patented Nov. 28, 1933

1,936,793

UNITED STATES PATENT OFFICE 1,936,793

POINT SOURCE LIGHT FOR TELEVISION AND PICTURE RECEIVING

Dewey D. Knowles, Wilkinsburg, Pa., assignor to Westinghouse Electric & Manufacturing Company, a corporation of Pennsylvania Application February 5, 1929. Serial No. 337,698

1 Claim. (Cl. 176—122)

My invention relates to glow-discharge lamps and particularly to glow-discharge lamps adapted for use in television and other devices where rapid variation of light intensity is necessary.

One object of my invention is to provide a light source combining high intensity, small dimensions, and ability to respond instantaneously to variations of the electric current supply thereto.

Another object of my invention is to provide a light source combining high intensity with small dimensions and ability to respond rapidly to variations of current supply and having a long operative life devoid of changes in luminous efficiency.

Another object of my invention is to provide a light source of high intensity and capable of rapid response to variations of current supply and in which the major portion of the emitted light is projected in a predetermined direction.

A further object of my invention is to provide a glow-discharge lamp adapted to provide a light source of high intensity and small dimensions which avoids deterioration of the transparency of the walls of the containing vessel through cathode sputtering of the metals constituting the electrodes.

Other objects of my invention will be apparent upon reading the following specification, in which The figure is a view, partly in section and partly in elevation, of a glow-discharge lamp embodying one form of my invention.

For many purposes, such as television or photo-film work, a light source is desired which has a high intensity but which is capable of accurate and instantaneous response to rapid fluctuations of some electrical controlling quantity. One of the best devices of this character comprises an electrical-discharge tube in which a glow discharge takes place between a pair of electrodes immersed in a gas at a substantial pressure. For many such devices, it is essential that the light source shall be concentrated into a relatively small area, but that the luminous intensity of this area shall be relatively high.

In accordance with one feature of my invention, I provide a light source of the above-described character by producing an electrical discharge between two electrodes enclosed within an interior chamber, of which one electrode forms a portion of the wall. This electrode contains a hollow portion which ends in a relatively small opening in the wall aforesaid. When the electrical discharge is produced between the electrodes within the chamber, it concentrates within the hollow portion of the above-described electrode so that the latter may be referred to as a "crater" for the electrical discharge. In the interior of this crater, the luminous intensity is very high and the small opening at the end of the crater allows the light to be projected outward and so forms a light source of high intensity and small dimensions.

For most purposes, it is preferable to make the hollow electrode just described the cathode of the electrical discharge. As is well known, electrodes in a gaseous discharge tend to "sputter"; that is to say, the surface molecules of the electrode are apparently vaporized by the the gaseous ions of the electrical discharge impinging thereon, and are deposited in a metallic film on any surrounding objects. This is particularly true in the case of the cathode; and in gaseous discharge lamps of the prior art, great difficulty has been occasioned by the metallic films depositing on the glass of the container and rendering it opaque after a relatively short period of use. It is one feature of my invention that the electrical discharge terminates in the hollow crater above-described; and any metal sputtered from one portion of the electrode surface merely deposits on another portion of the electrode surface. Since the aperture from which the light is emitted is in the end of the crater and is of extremely small dimensions, substantially no particles of sputtered metal are projected through it, and, accordingly, blackening of the glass bulb enclosing the discharge device is substantially absent.

With the foregoing and other objects in mind, my invention will be more readily understood from the following description of the figure, in which a glass tube 1 of conventional design encloses an internal electrode chamber comprising a cylinder tube 2 which may be of quartz and which has an electrode 3 which may conveniently be a nickel rod positioned in the axis thereof. The lower end of the tube 2 is seated upon and makes close contact with the glass stem 4 in which the rod 3 is set. The upper end of the tube 2 is provided with a metallic plug 5 which may be of iron. The interior of the plug 5 is bored out for the major portion of its length with a hole of substantial diameter which forms the "crater" of the electrical discharge, as previously described. The lower end of the hole is preferably counter-bored so that the hole expands at its lower end to the full diameter of the tube 2. The upper end of the plug 5 is provided with an opening 6 of relatively small diameter and of the size of the light source which it is desired to employ. Electrical connections 7 and 8 are provided through the walls of tube 1 so that the electrodes 3 and 5 may be connected in any desired external circuits.

The discharge tube above-described is exhausted to a high vacuum and filled with a gaseous atmosphere, which may be one of the noble gases, such as neon or argon, or may be mercury vapor or may be some mixture of the foregoing, depending upon the particular color of light desired and other conditions of use for which the device is intended. Methods of exhausting such tubes and filling them with gas in such a manner that the latter will remain in its pure and unchanged condition throughout a long period of use are well known in the lamp art and require no extended description here.

When a sufficient voltage is impressed between the electrodes 3 and 5, a glow-discharge will occur between them which will render the gas in the interior of the tube 2 highly luminous. If the electrode 5 is made the cathode, this discharge will concentrate within the hollow interior of the electrode 5 and an intense light will be projected through the aperture 6.

While it is necessary to employ a reasonably high current density at the electrode 5 in order to provide a sufficiently intense source of illumination for many of the purposes for which such a tube is designed to be used, the greater part of the metal sputter from one portion of the interior surface of the electrode 5 will deposit on some other portion of that interior surface and substantially none of it will be projected through the aperture 6. Even though some of the sputtered metal is projected from the lower end of electrode 5 onto the tube 2, no harm will be done since the latter is not relied upon to transmit light to points exterior to it. In fact, it may be desirable to form a large portion of the wall of the tube 2 from opaque material, or even from metal, it being sufficient that insulation intervenes at some point between the electrode 5 and the electrode 3. Thus, it may be found desirable to coat the major part of the surface of the tube 2 with a material having high reflecting power; for example, if the tube 2 is a vitreous material, it may be given a mirror surface by well known processes of depositing silver upon glass.

With any of the foregoing constructions, any metal surface forming the interior walls of the electrode chamber may be highly polished to increase their reflecting power.

While, in accordance with the patent statutes, I have described in detail a particular embodiment of my invention, it will be evident that the principles thereof may be embodied in numerous other structures which will be readily devised by those skilled in the art. Accordingly, I desire that the following claim be limited only in accordance with its express terms and in view of the prior art.

I claim as my invention:

An electrode discharge device comprising a vacuum-tight enclosure, a chamber therein enclosing a first electrode and a second electrode having a portion within said chamber and an aperture through it at the point in its surface farthest removed from said first electrode, said electrodes being axially aligned and axially spaced, said second electrode having a portion without said chamber and an electrical connection to said portion.

DEWEY D. KNOWLES.